S. E. COGSWELL.
AUTOMATIC SAMPLER.
APPLICATION FILED SEPT. 19, 1918.
1,329,110.
Patented Jan. 27, 1920.
2 SHEETS—SHEET 1.
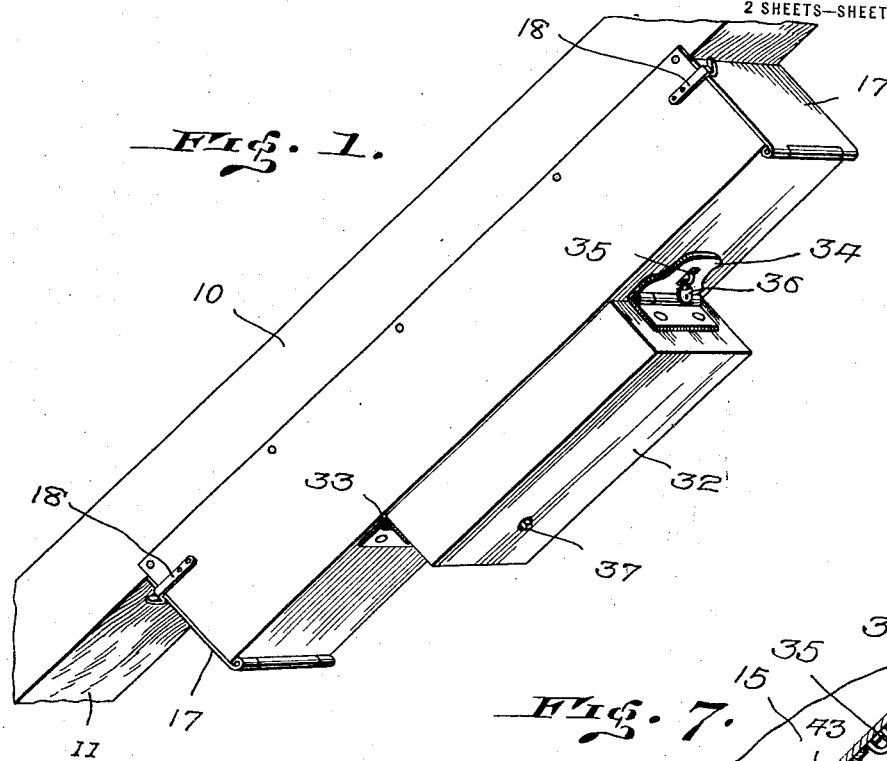
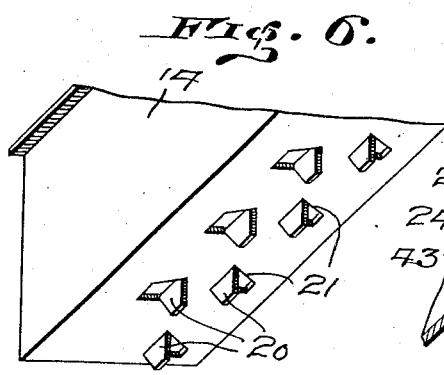
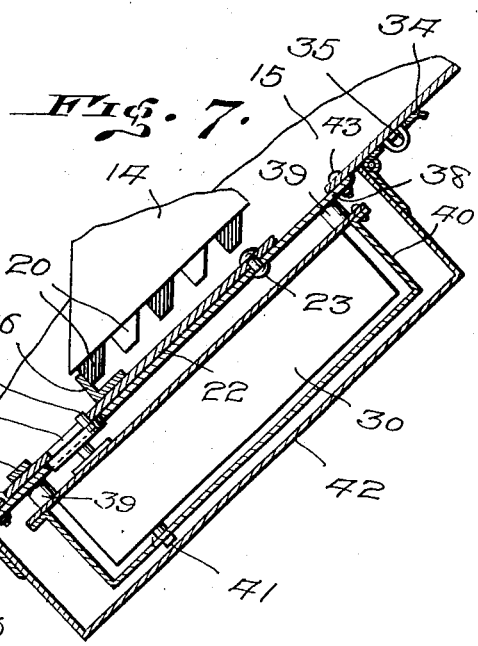
WITNESS:
INVENTOR.
Seward E. Cogswell
BY
ATTORNEYS

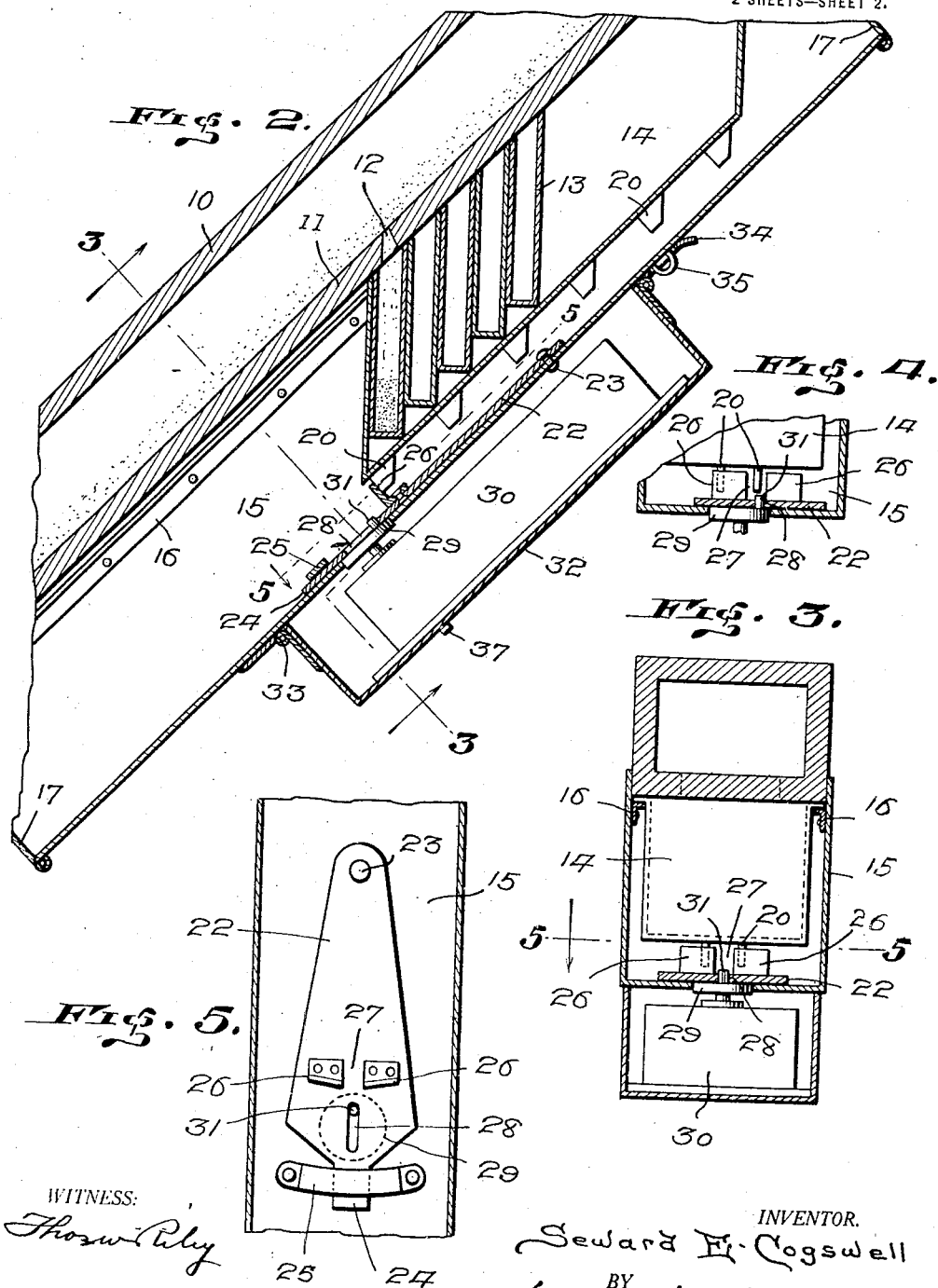

UNITED STATES PATENT OFFICE.

SEWARD E. COGSWELL, OF CENTRAL CITY, NEBRASKA.

AUTOMATIC SAMPLER.

1,329,110.      Specification of Letters Patent.      Patented Jan. 27, 1920.

Application filed September 19, 1918. Serial No. 254,753.

*To all whom it may concern:*

Be it known that I, SEWARD E. COGSWELL, a citizen of the United States, residing at Central City, in the county of Merrick and State of Nebraska, have invented certain new and useful Improvements in Automatic Samplers; and I do hereby declare the following to be a full, clear, and exact description of the invention, such as will enable others skilled in the art to which it appertains to make and use the same.

This invention relates to an automatic sampler, and particularly to a construction adapted to secure samples of material at predetermined periods, and comprises an improvement in the escapement mechanism disclosed in my prior patent, No. 1241196, dated September 25, 1917.

The invention has for an object to provide a novel and improved escapement mechanism for the tray comprising an oscillating member having dogs coöperating with lugs upon the tray to effect an intermittent travel of the tray carrying the sample tray receptacles.

A further object of the invention is to provide a novel construction of the dog mechanism comprising a pivoted bar having spaced dogs thereon and provided with a slot coöperating with a crank member actuated by a time controlled motor.

Another and further object of the invention is to provide a novel mounting and inclosure for the motor or clock mechanism so that the same may be protected both from tampering and from dust and so disposed as to actuate at predetermined periods the dog mechanism which coöperates with the tray carrying the samples.

Other and further objects and advantages of the invention will be hereinafter set forth and the novel features thereof defined by the appended claims.

In the drawing:

Figure 1 is a perspective showing the invention applied;

Fig. 2 an enlarged vertical section thereof;

Fig. 3 a section on line 3—3 of Fig. 2;

Fig. 4 is a sectional detail of a portion of Fig. 3 with the parts in shifted position;

Fig. 5 is a section on line 5—5 of Figs. 2 and 3;

Fig. 6 is a detail bottom perspective of the tray; and

Fig. 7 a detail section of a modified form of mounting for the time controlled motor.

Like numerals refer to like parts in the several figures of the drawings.

The numeral 10 designates the usual spout or chute through which grain, flour or other crushed, granulated or comminuted material is passed. This chute is provided in its bottom with a slot or opening 12 which is adapted to discharge into each of a series of receptacles or pockets 13 carried by the tray or container 14 disposed within the casing 15 secured to the chute 10. This tray 14 is adapted to feed downward by gravity and guided in its travel by the flanges 16. The ends of the casing are provided with any form of closure desired, for instance, the hinged covers 17 adapted to be held in position by the clasps 18, as shown in Fig. 1. The parts so far described are substantially similar in construction and operation to those disclosed in my prior patent No. 1241196.

The underface of the tray 14 is provided with any desired number of staggered lugs 20 arranged at opposite sides of the longitudinal axis of the tray. These lugs may be formed in any desired manner, for instance, by being punched from the material of the bottom 21 of the tray thus leaving apertures therein from which any material overflowing from the pockets 13 may escape. The number of these lugs and their distance from each other may be varied at will, dependent upon the number of pockets inserted in the tray and the consequent number of intermittent movements imparted thereto. For the purpose of coöperating with the lugs 20 an escapement member 22 is provided and comprises a plate or bar pivoted at one end, as at 23, and having its opposite end 24 disposed beneath a guide and retaining plate 25. This bar is also provided upon its upper surface with dogs 26 spaced from each other to provide an open path 27, through which the lugs 20 of the tray may pass in the feeding movement. These dogs 26 may be formed of any desired material or configuration and are preferably disposed at an angle to a straight line extending transversely across the bar or plate so as to present the faces of the dogs at an angle to the lugs so that in their lateral movement friction is avoided and less power required in the spring of the actuating motor. The bar 22 is also formed adjacent its free end with a slot 28 extending longitudinally thereof and adapted to be connected with a crank member 29 driven by a suitable motor 30 in any desired way, for instance by the pin 31 extending into said slot.

This motor 30 may be of any desired character and is preferably time controlled, such as a clock mechanism to provide the desired intervals between the taking of samples due to the intermittent travel of the pockets beneath the opening from the chute. This motor or clock mechanism may be mounted in any preferred manner to properly protect the same from dust, injury or tampering. One form thereof is shown in Figs. 1 and 2 where the motor is mounted in a box casing 32 hinged at 33 to the casing 15 and provided at its free end with a hasp member 34 adapted to embrace the staple 35 to which it may be secured by a lock 36 or other device as shown in Fig. 1. When this box casing is swung away from the casing 15 the pin of the crank member is withdrawn from the slot of the dog mechanism and the parts accessible for cleaning, while the winding-stem 37 of the motor is extended through the casing 32 so that it may be properly placed under tension without opening the casing.

In Fig. 7 a modified form of mounting for the clock motor 30 is shown wherein the motor is supported by a base plate 38 disposed beneath an opening in the casing 15 and secured thereto by any desired means for instance the nuts and bolts 43 by which it may be removed or properly adjusted so that the escapement members will lie in accurate relation to the lugs upon the tray 14. In this construction the motor is supported upon the plate by means of posts 39 which space it from the dust-proof casing 40 inclosing the motor and provides a proper space for the location and operation of the crank member which operates the bar 22 carried by the plate 38. In this construction the entire releasing mechanism is attached to and made part of the motor itself and the portion of the bottom of the case 15 which is cut away is of less area than the base plate 38 so that the latter when attached may be adjusted to secure perfect coördination of the lugs and escapement members and the edges of the plate overlap the edges of the casing to form a support for the attaching means of the plate. In the form of mounting for the motor shown in Fig. 2 the same is carried by the box casing and swings therewith while in this modified form the motor remains attached to the case 15, and when the box casing 42 is opened can only be removed by withdrawal of the securing means. The motor is suitably inclosed in a dust casing 40 connected to the plate 38 and through which casing the winding stem 41 extends. This casing 40 is entirely inclosed by a box casing 42 pivotally mounted and secured similar to the casing 32 before described and shown in Fig. 1. This method of mounting the motor permits any dust or material entering from the casing 15 to shift downward owing to the inclination of the casing 40 and its cover so as to be collected within the box casing 42 from which it may be readily removed, and the clock or time mechanism when so mounted is effectually inclosed so that it cannot be tampered with nor affected by dust or other conditions of operation.

The operation of this invention will be apparent from the foregoing description from which it will be seen that the tray containing the sample receptacles is advanced intermittently by the escapement movement so as to obtain samples at predetermined intervals of time from the material passing through the chute. The improved construction of this escapement mechanism provides a single oscillating member having dogs controlling the intermittent movement of the tray and adapted to be directly operated by the time controlled motor. The mounting for this motor also effectually protects it against tampering and from dust in the mill as it is entirely inclosed within the box casing. It will therefore be seen that this invention presents a simple, efficient and economically manufactured form of escapement mechanism for an automatic grain sampler.

While a specific construction and arrangement of the parts has been illustrated and described, still the invention is not confined thereto as the novel features thereof are set forth by the following claims.

What I claim is:

1. An escapement mechanism for an automatic sampler, a sliding container provided with staggered stop lugs, a swinging escapement bar pivoted at one end and provided with a longitudinal slot, lugs carried by said bar at opposite sides of said slot, a crank arm disposed at one side of said bar and having a pin entering the said slot, and means for driving said crank arm.

2. An escapement mechanism for an automatic sampler, a sliding container provided with staggered stop lugs, a swinging escapement bar pivoted at one end and provided with a longitudinal slot, lugs carried by said bar at opposite sides of said slot, a crank arm disposed under said bar and having a pin entering the said slot, means for driving said crank arm, and a pivoted box casing adapted to inclose said driving means.

3. An escapement mechanism for an automatic sampler, embodying a container mounted for sliding movement in an inclined path, an inclined member underneath said container, said container having staggered stop lugs depending from the bottom thereof, an inclined escapement bar seated on said member and pivoted near its upper end to said member, the escapement bar having a pair of lugs projecting upwardly therefrom at opposite sides of a longitudinal line to alternately engage to the aforesaid lugs when the bar is oscillated, and a motor suspended from and located below said member, said motor having an upwardly extending crank, and the escapement bar being provided near its lower end with means engaging over said crank.

In testimony whereof I have signed my name to this specification in the presence of two subscribing witnesses.

SEWARD E. COGSWELL.

Witnesses:
  FLOYD BENSON,
  ADDIE L. SOLT.